United States Patent [19]

Conti

[11] 4,411,437

[45] Oct. 25, 1983

[54] SEAL WITH FACE-TO-FACE FLAT METAL SEALING WASHERS

[75] Inventor: Roger C. Conti, Simpsonville, S.C.

[73] Assignee: Reliance Electric Company, Greenville, S.C.

[21] Appl. No.: 398,105

[22] Filed: Jul. 14, 1982

[51] Int. Cl.³ .............................................. F16J 15/28
[52] U.S. Cl. ........................................ 277/53; 277/54; 277/83; 277/175; 277/208; 277/236
[58] Field of Search .............. 277/53, 54, 207 R, 208, 277/236, 174, 175, 83

[56] References Cited

U.S. PATENT DOCUMENTS

| | | | |
|---|---|---|---|
| 1,388,168 | 8/1921 | Bullard | 277/175 |
| 1,578,237 | 3/1926 | Reynolds | 277/53 X |
| 2,983,529 | 5/1961 | Price | 277/208 X |
| 3,008,740 | 11/1961 | Hinkle | 277/174 X |
| 3,325,175 | 6/1967 | Lower | 277/208 X |
| 3,333,855 | 8/1967 | Andresen | 277/175 X |
| 3,460,842 | 8/1969 | Pointer et al. | 277/53 X |

FOREIGN PATENT DOCUMENTS

| | | | |
|---|---|---|---|
| 520754 | 3/1961 | Fed. Rep. of Germany | 277/175 |
| 2014298 | 7/1971 | Fed. Rep. of Germany | 277/53 |
| 1066934 | 1/1954 | France | 277/175 |
| 339526 | 12/1930 | United Kingdom | 277/236 |
| 705444 | 3/1954 | United Kingdom | 277/53 |
| 724647 | 2/1955 | United Kingdom | 277/53 |

Primary Examiner—Robert S. Ward, Jr.
Attorney, Agent, or Firm—Marmaduke A. Hobbs

[57] ABSTRACT

A clearance seal for rotating shafts adapted for use with pillow blocks and the like, in which a series of washers is disposed in a housing of U-shaped cross sectional configuration. The washers are of thin metal and are stacked in face-to-face contact with one another and held in the housing in firm contact by a resilient member such as a wave spring washer. Clearance is provided between the inside diameter of the sealing washers and an inner race, shaft or similar rotating element, and the washers are adapted to move radially relative to one another to adjust to shaft misalignment. The seal is so constructed and arranged that the bearing can be readily purged by the flow of grease through the clearance provided by the seal to provide optimum performance over an extended period of time without interference from contamination.

7 Claims, 4 Drawing Figures

U.S. Patent    Oct. 25, 1983    Sheet 1 of 2    4,411,437
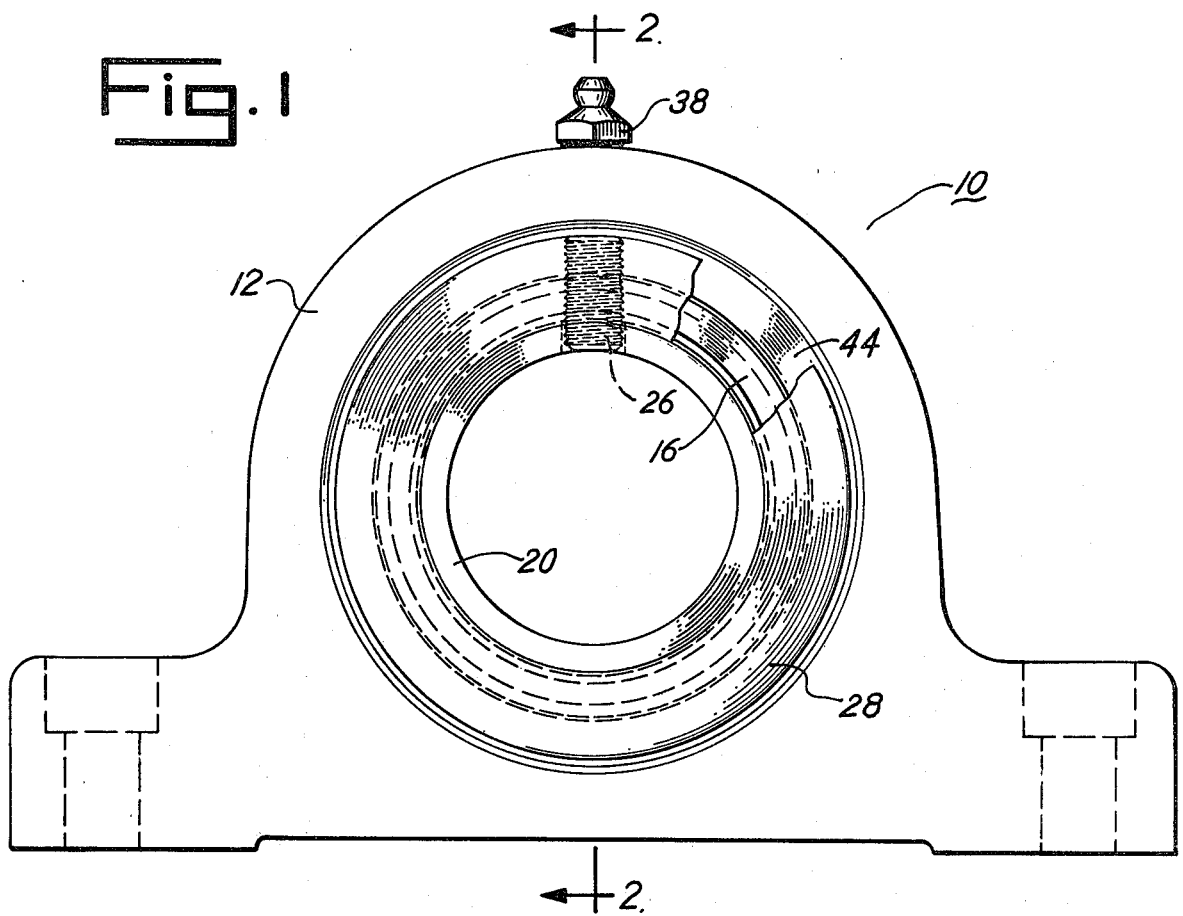
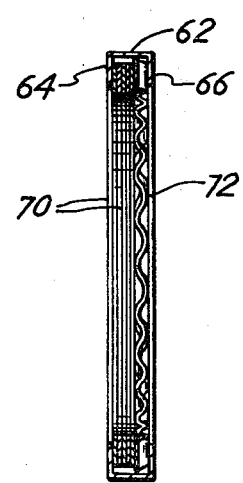
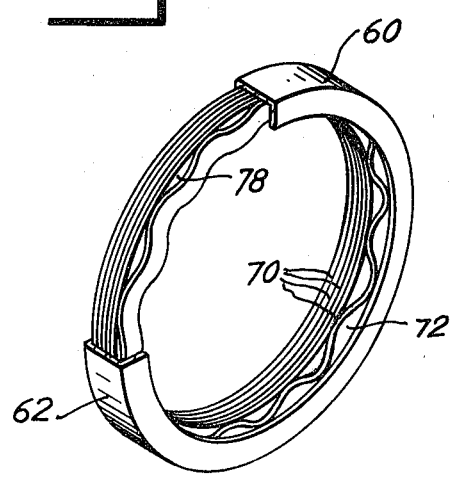

SEAL WITH FACE-TO-FACE FLAT METAL SEALING WASHERS

BACKGROUND OF THE INVENTION

A type of shaft seal for high temperature and/or high speed rotating shafts consists of a clearance seal having a plurality of relatively thin metal rings arranged in face-to-face contact with one another and capable of sliding radially relative to one another in order to adapt to misalignment of the shaft and the shaft bearing in which the seal is used. The rings, which normally are of steel, have an inside diameter slightly larger than the diameter of the shaft or inner race, depending on the assembly with which the seal is used; and hence, a path is provided for flow of the lubricant from the bearing, resulting in a desirable purging action to maintain clean lubricant in the bearing and to prevent ingress of dirt and other foreign matter into the bearing. One example of a seal of this type is disclosed in U.S. Pat. No. 3,460,842, issued to P. H. Pointer et al. on Aug. 12, 1969. While this patent relates to a seal of the foregoing type, it is primarily concerned with the use of a guard washer for warning the user that misalignment of the shaft has reached maximum permissible limits. In this prior art seal, the rings are held in place by the clamping action of the sides of the seal housing, and the guard washer which in effect forms one side of the housing in the final seal assembly. The metal rings are thin in the axial direction, and the radial sides are in face-to-face contact and slide relative to one another so that the rings are offset in the radial direction when the rings adjust to misalignment of the shaft. In this prior seal, a controlled lubrication path from the bearing is sometimes difficult to achieve, and after the seal and bearing have been subjected to a dirty environment for prolonged periods of time, the seal may not give optimum performance, since the parts thereof are not properly or adequately lubricated. Further, a second and unwanted path for egress of the lubrication from the bearing, around the outside diameter of the rings, permits escape of the lubricant without effectively purging the clearance between the inner race or shaft and the sealing rings.

SUMMARY OF THE INVENTION

One of the principal objects of the present invention is to provide a clearance shaft seal having a plurality of axially arranged metallic rings, in which the grease path through the seal from the bearing or the like can effectively be controlled during purging and flushing of contaminants along the inside diameter of the seal rings, and in which the grease will not flow to the outside diameter of the sealing rings and outwardly along the interface at the seal housing as in the prior seals of the type, but will maintain a controlled flow of lubricant through the clearance at the inside diameter of the sealing ring, thus maintaining the seal in optimum operating condition.

Another object of the invention is to provide a shaft seal of the aforementioned type, in which the sealing rings are entrapped in a housing and are held together in face-to-face contact by a resilient force which permits the rings to adapt readily to shaft misalignment.

Still another object of the invention is to provide a shaft seal with a plurality of flat, axially spaced rings in face-to-face contact, which provides a single, controlled path for the flow of lubricant from a bearing or the like to permit effective purging and lubrication of the parts of the seal, and which is so constructed and designed that the sealing rings are retained in a predetermined, uniform relationship by a resilient force applied axially thereto.

The shaft seal embodying the present invention includes generally a plurality of axially positioned sealing rings of flat metal, disposed in a housing of U-shaped cross sectional configuration and urged together and into contact with one of the side walls of the housing by a resilient member, normally consisting of a wave spring positioned axially with respect to the sealing rings. The wave spring usually is disposed between one of the side walls of the housing and the stack of axially positioned sealing rings. The sealing rings have a slightly larger inside diameter than the outside diameter of the inner race of the bearing, to provide a clearance for minimizing friction and provide effective flow of lubricant for purging contaminants. The rings are capable of shifting radially relative to one another to adapt to shaft misalignment.

BRIEF DESCRIPTION OF THE DRAWINGS

FIG. 1 is an end elevational view of a pillow block in which the present clearance seal is installed;

FIG. 3 is a diametrical cross sectional view of the seal contained in the pillow block of FIGS. 1 and 2; and FIG. 4 is a perspective view of the seal shown in FIG. 3, in which a portion of the housing of the seal has been broken away to show more effectively the construction of the seal.

DETAILED DESCRIPTION OF THE PREFERRED EMBODIMENT

Figure 2:
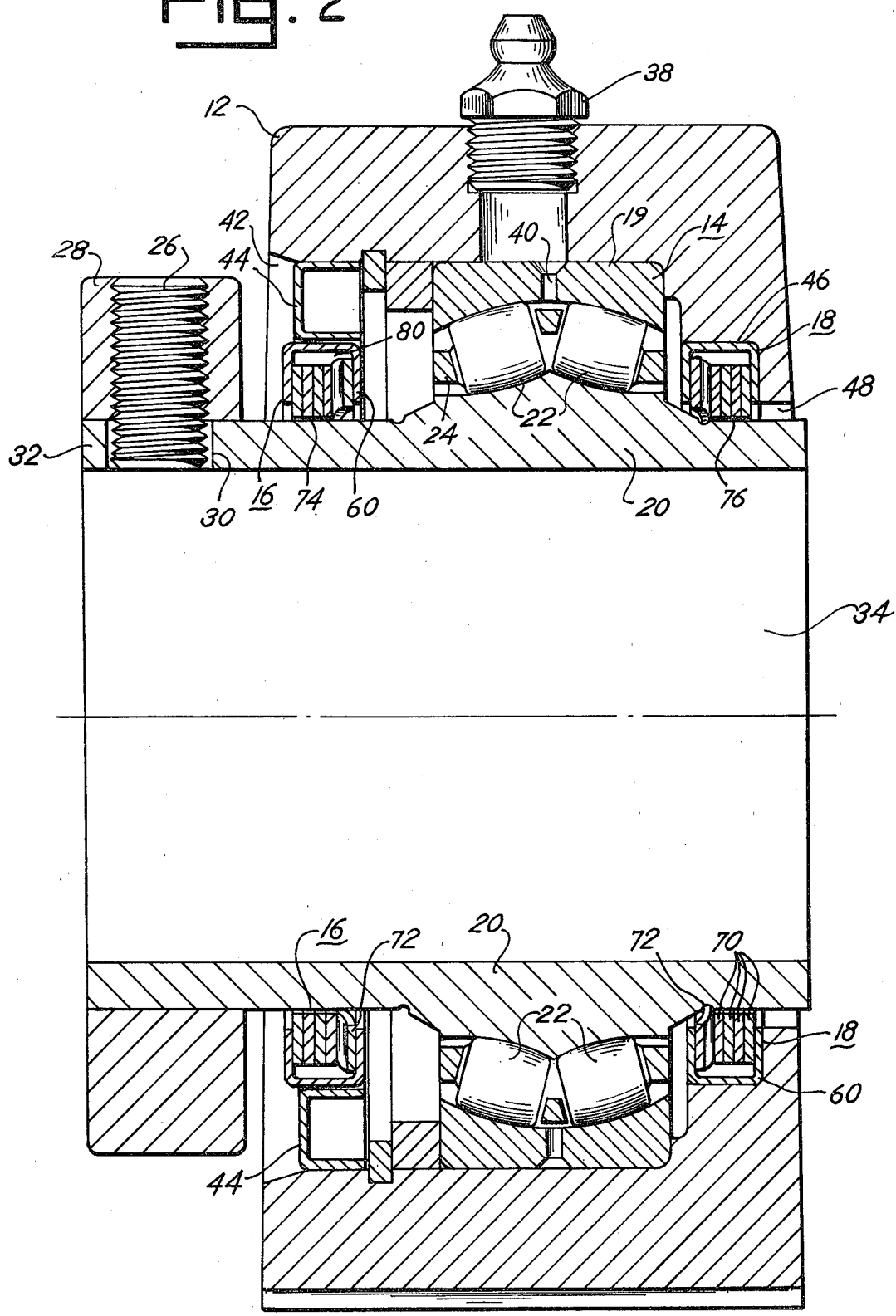
FIG. 2 is an enlarged vertical cross sectional view of the pillow block shown in FIG. 1, the section being taken on line 2—2 of the latter figure.

Referring more specifically to the drawings and to FIGS. 1 and 2 in particular, numeral 10 indicates generally a pillow block, having a housing 12, bearing 14, and seals 16 and 18 embodying the present invention. The bearing includes an outer race 19 and an inner race 20, and rollers 22 held in position between the two races by cage 24. The inner race is mounted on a shaft, not shown, and is secured thereto by a set screw 26 threadedly received in a collar 28 and extending through a hole 30 in the extension 32 of the inner race, and when the set screw is tightened, it seats on the shaft disposed in bore 34 in the inner race. With the inner race secured to the shaft in the foregoing manner, the shaft and inner race rotate together throughout the operation of the shaft and pillow block. Lubricant fixture 38 is disposed in the pillow block and is connected with the bearing through one or more ports 40 extending through the outer race of the bearing. While the seals are illustrated with one type of pillow block, they may be used satisfactorily in other types of devices or bearing assemblies, and while the seals are shown and described as used directly with the inner race of the bearing, they may be used directly with a shaft or other similar rotating elements.

The seals, 16 and 18, are the same in construction and operation but are installed in the pillow block in reverse position, as will be explained in greater detail hereinafter. Seal 16 is disposed in opening 42 of housing 12 and held in place by a seal carrier 44, retained in the opening by the annular wall thereof. Seal 18 is seated in an internal recess 46 in housing opening 48 and is retained in the recess by a snug fit of the seal in the recess. Since the two seals are the same, only one will be described in detail and the same numerals will be used to identify like parts. The seals include an annular housing 60 of U-shaped cross section, having an outer peripheral wall 62 and side walls 64 and 66, and a plurality of flat sealing washers 70 stacked in face-to-face contact and having the same internal and external diameter, is disposed in housing 60. As illustrated in FIG. 2, four such washers are used; however, a greater or lesser number may be used for various applications. The sealing washers 70 are held together with the flat sides in contact with one another by a wave washer 72 disposed between the stack of sealing washers and side 66 of the housing. The wave washer is resilient and applies a constant pressure on the stack of washers to hold the washers in firm contact, and the outside washer in firm contact with the inner surface of side wall 64. The sealing and wave washers are entrapped in the housing as the seal is constructed by placing the stack of washers in the housing before the side walls are deformed inwardly from the outer periphery to the position illustrated in FIGS. 3 and 4, wherein they embrace the sealing and wave washers to form a permanent seal assembly. The sealing washers are constructed of metal, such as steel, and have an inside diameter slightly larger than the diameter of the lateral extensions on inner race 20 so that a clearance is provided between the sealing washers and the inner race when the shaft is in its normal aligned position in the pillow block. The wave washer also has an inside diameter larger than the inner race, and preferably somewhat larger than the inside diameter of the sealing washers, as can be seen in FIGS. 2 and 3. The wave washer is normally constructed of spring steel; however, other suitable materials may be used for this washer.

The sealing washers are capable of sliding radially relative to one another in order to permit the bearing to adjust to misalignment of the shaft relative to the pillow block. In the embodiment shown, the inner race 20 is capable of moving angularly with respect to the outer race and the axis of the pillow block when the shaft is angularly misaligned. The peripheral surfaces of the sealing washers are spaced inwardly from the internal surface of peripheral wall 62 to provide a space for the radial movement of the sealing washers relative to one another and for the radial movement of the outside end washer relative to the adjacent side wall of the housing, when the sealing washers adjust to misalignment of the shaft and of inner race 20. The internal diameter of the wave washer does not interfere with and normally is not contacted by the rotating surface of the inner race 20, regardless of the extent of the misalignment of the shaft and the consequent misalignment of the inner race. The construction of seal 18 is the same throughout as the construction of seal 16. However, in seal 18 the positions of the sealing washers and wave washer are reversed so that the wave washer in each assembly is disposed on the inner side of the seal. This does not require seals of different constructions, since the seals are merely reversed in position when they are assembled in the housing.

In the use and operation of the present clearance seals for rotating shafts, the seals are assembled in the housing of the pillow block in the manner illustrated in FIG. 2, around the extensions of the inner race and in spaced relation to the surface thereof, thus providing spaces 74 and 76 between the sealing rings and the inner race. When the pillow block is lubricated, lubrication flows from the lubrication fixture 38 through port 40 into the bearing and thence laterally to the seals. The excess lubricant passes through the clearances 74 and 76 to purge or flush the bearing of impurities and to prevent the ingress of dirt, moisture and other foreign matter into the bearing. When the pillow block has been used for a prolonged period of time, the lubricant may become contaminated, and the clearances 74 and 76 may tend to become somewhat restricted by the contamination. However, the clearances 74 and 76 are maintained as effective flow passages for the lubricant, which is forced through the passages to purge the bearing and seal and into the seal to maintain the seal in proper operating condition. The flow of lubricant into space 80 also facilitates lubrication of the sealing washers relative to one another and relative to the internal side wall 64 of housing 60, so that the washers can readily adapt to the shaft misalignment by sliding radially relative to one another and to the housing.

It is seen from the foregoing, that the present clearance seal for rotating shafts is relatively simple in construction and operation and, in view of the construction, is capable of operating in high temperature conditions and for prolonged periods of time without failure. The seals can readily be installed as the pillow block is being assembled and can be replaced as a complete seal assembly. Since one distinct lubrication path is provided, the seal is capable of giving optimum performance for prolonged periods of time, in that effective purging action will continue to take place regardless of the contamination which may tend to accumulate in and around the seals. While the wave washer is shown in the drawing disposed on the inner side of the seals, either one or both of the seals can be modified to place the wave washer between two of the sealing washers, thus seating opposite end washers on the internal surfaces of walls 64 and 66. The operation of the seals would be essentially the same as that described and shown in detail hereinbefore.

While only one embodiment of the present shaft seal has been described in detail herein, various changes and modifications may be made without departing from the scope of the invention.

I claim:

1. A clearance seal for use with pillow blocks or similar devices having a bearing with an inner race and/or other rotatable element, comprising an annular housing of U-shaped cross sectional configuration with an annular peripheral wall and spaced, radially extending side walls joined to said peripheral wall, a plurality of flat metal sealing washers in face-to-face contact disposed in said housing, all having an outside diameter smaller than the diameter of the inner side of said peripheral wall of the housing and normally being spaced from said inner side and moveable radially relative to one another to adjust for misalignment of the shaft, and a resilient washer disposed in said housing and seated against said washers for urging one of said sealing washers into contact with the internal surface of one of said side walls.

2. A clearance seal for use with pillow blocks or similar devices as defined in claim 1, in which said sealing washers have the same inside and outside diameters, and the inside diameter is slightly larger than the diameter of the portion of said rotating element surrounded by the seal when assembled in the device.

3. A clearance seal for use with pillow blocks or similar devices as defined in claim 1, in which said resilient washer is a metal wave washer, disposed in said housing and engaging at least one of said sealing washers.

4. A clearance seal for use with pillow blocks or similar devices as defined in claim 2, in which said plurality of sealing washers forms a stack having opposite end washers, and said resilient washer is a metal wave washer disposed between one of said side walls and one of the end washers of said sealing washers, and in which the other of said end washers seats against one of said side walls.

5. A clearance seal for use with pillow blocks or similar devices as defined in claim 1, in which said plurality of sealing washers forms a stack having opposite end washers, and said resilient washer is a metal wave washer disposed between one of said side walls and one of the end washers of said sealing washers, and in which the other of said end washers seats against one of said side walls.

6. A clearance seal for use with pillow blocks or similar devices as defined in claim 2 in which the radial width of the sealing washers is greater than the radial width of the housing side walls on the internal side thereof.

7. A clearance seal for use with pillow blocks or similar devices as defined in claim 1 in which the radial width of the two end sealing washers is greater than the radial width of the housing side walls on the internal side thereof.

* * * * *